UNITED STATES PATENT OFFICE

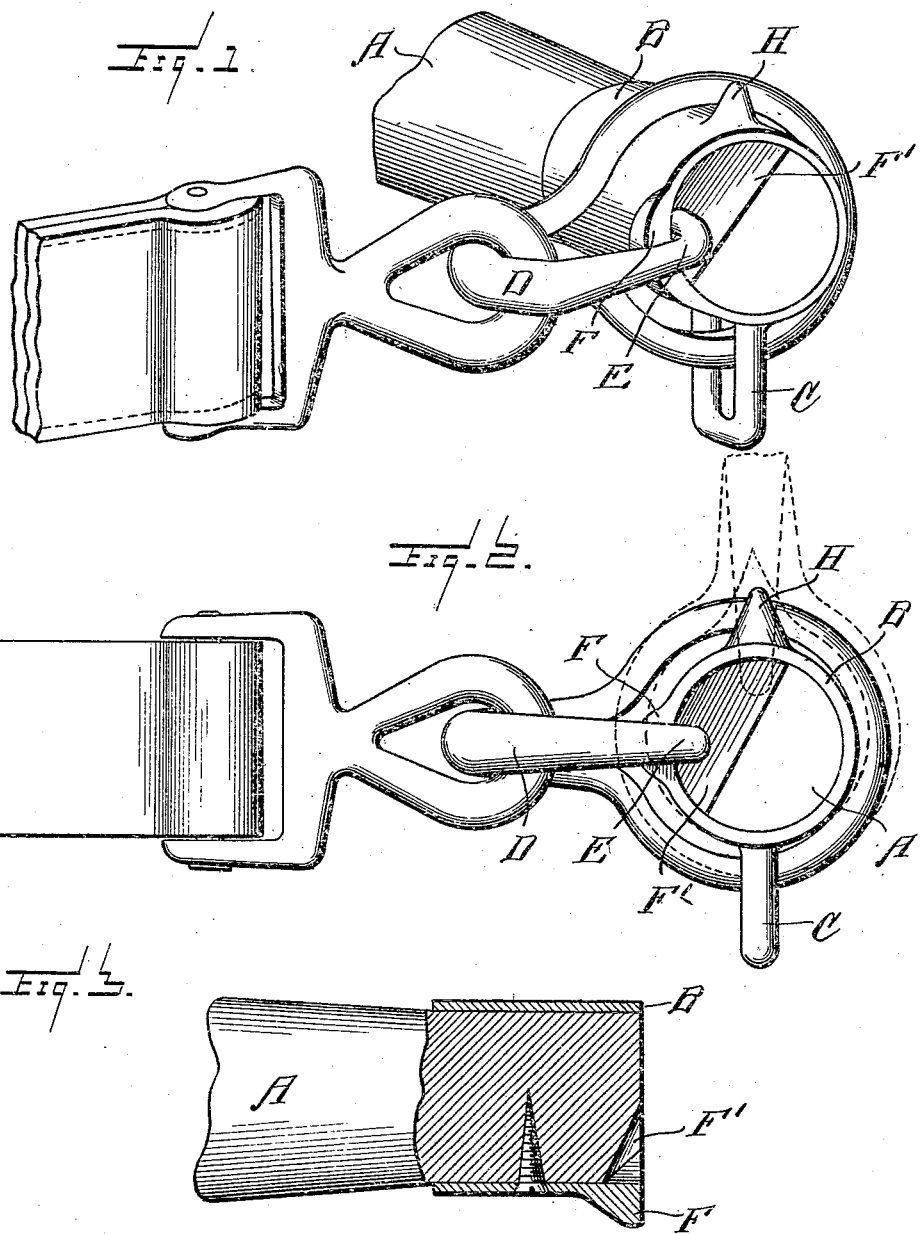

CHARLES E. JONES, OF WINDSOR, MISSOURI.

WHIFFLETREE-HOOK.

954,810.  Specification of Letters Patent.  Patented Apr. 12, 1910.

Application filed December 27, 1909. Serial No. 535,078.

*To all whom it may concern:*

Be it known that I, CHARLES E. JONES, a citizen of the United States, residing at Windsor, in the county of Henry and State of Missouri, have invented certain new and useful Improvements in Whiffletree-Hooks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in whiffle tree hooks and comprises various details of construction, combinations and arrangements of parts which will be hereinafter fully described and then specifically defined in the appended claim.

I illustrate my invention in the accompanying drawings, in which:—

Figure 1 is a perspective view showing a trace connected to my improved whiffle tree hook. Fig. 2 is an end view of the whiffle tree showing the hook in position to be detached by being swung outward, and Fig. 3 is a sectional view through the end of the band upon the whiffle tree showing the indentation in the end of the whiffle tree and the reinforced portion of the band.

Reference now being had to the details of the drawings by letter, A designates a whiffle tree having a metallic band B fitted over one end thereof and which has an integral eye C thereon and adapted to retain the whiffle tree hook D upon said band. A portion of said band is reinforced as at F where the pull of the free end of the hook comes against said band. The end E of the whiffle tree hook is inwardly bent and a portion of the whiffle tree is recessed away as at F' in order to allow the free end of the whiffle tree hook to engage the outer end of the band in the manner shown in the drawings making a substantial clevis pull. At any convenient location, preferably opposite said eye is a lug H which, when the whiffle tree hook is swung to the position shown by dotted lines in Fig. 2, will allow the hook to pass over said lug and, when the whiffle tree hook is turned in the position shown in Fig. 1, said lug H serves to hold the hook upon the band and will prevent the cockeye of the trace being accidentally uncoupled owing to the free end of the whiffle tree hook being held so close to the end of the band as to make it impossible for the cockeye of the trace to disconnect therefrom.

In operation, when it is desired to connect the trace, the hook is swung to the position shown in dotted lines in Fig. 2 which will allow said hook to swing free from the end of the whiffle tree sufficient to receive the cockeye of the trace. After the connection has been made and the whiffle tree hook makes a partial revolution or to the position shown in Fig. 1, the parts will be securely locked together and any pressure intermediate the free end of the whiffle tree hook and the outer end of the band will come opposite the reinforced portion as will be readily understood.

The portion of the whiffle tree hook which encircles the band being made of half round material, with the flat portion inward to engage the outer portion of the band, will be less inclined to wear the band than if made of round material.

What I claim to be new is:—

In combination with a whiffle tree having a recess formed at one end thereof, a ferrule fitted over the end of the whiffle tree and forming one wall to said recess, an integral lug projecting from the circumference of said ferrule, the latter having a laterally projecting reinforced portion upon the outer surface of the part forming the wall of the recess, a whiffle tree hook having a shank portion formed into a ring fitted over said ferrule, means for holding said ring upon the latter, one end of the hook being adapted to engage the inner face of that portion of the ferrule forming the wall of the recess, as shown and described.

In testimony whereof I hereunto affix my signature in the presence of two witnesses.

CHARLES E. JONES.

Witnesses:
W. F. BOWEN,
J. F. RIDENOUR.